United States Patent
Sweet

(10) Patent No.: US 7,260,166 B2
(45) Date of Patent: Aug. 21, 2007

(54) SYSTEMS FOR SYNCHRONIZING RESETS IN MULTI-CLOCK FREQUENCY APPLICATIONS

(75) Inventor: James D Sweet, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 747 days.

(21) Appl. No.: 10/640,632

(22) Filed: Aug. 14, 2003

(65) Prior Publication Data

US 2005/0036577 A1    Feb. 17, 2005

(51) Int. Cl.
*H04L 7/00* (2006.01)
(52) U.S. Cl. ...................... 375/354; 713/400
(58) Field of Classification Search ............... 375/354; 713/400

See application file for complete search history.

(56) References Cited

U.S. PATENT DOCUMENTS

| | | | | |
|---|---|---|---|---|
| 5,473,768 A | * | 12/1995 | Kimura | ...... 713/501 |
| 6,487,466 B1 | * | 11/2002 | Miyabe | ...... 700/82 |
| 6,665,802 B1 | * | 12/2003 | Ober | ...... 713/320 |
| 2002/0091861 A1 | * | 7/2002 | Kim et al. | ...... 709/249 |
| 2004/0128578 A1 | * | 7/2004 | Jonnalagadda | ...... 713/400 |

\* cited by examiner

*Primary Examiner*—David C. Payne
*Assistant Examiner*—Nader Bolourchi
(74) *Attorney, Agent, or Firm*—Sterne, Kessler, Goldstein & Fox, P.L.L.C.

(57) ABSTRACT

Methods and systems for synchronizing a reset signal with a local clock that drives a circuit. In the circuit, the reset signal can be used to reset one or more flip-flops, memory devices, and/or logic. Sychronization of the reset signal allows the reset signal to change at an appropriate time period in relation to the lock clock signal driving the circuit. This ensures the circuit will remain stable during reset, and no data will be lost as it is processed in the circuit. Other aspects of the invention can include using a plurality of reset signals (e.g., software, hardware, local software, etc.) to form the reset signal and using a reset control system to control resets during testing of the circuit.

10 Claims, 6 Drawing Sheets

SYSTEMS FOR SYNCHRONIZING RESETS IN MULTI-CLOCK FREQUENCY APPLICATIONS

BACKGROUND OF THE INVENTION

1. Field of the Invention

The present invention is related to synchronization of reset signals.

2. Background Art

Integrated circuit chips typically include circuits that can be reset by one or more reset signals. The reset signals include hardware-based reset signals and/or software-based reset signals. Reset signals can be active low or active high. Active low reset signals reset circuits when the reset signal goes low. Active high reset signals reset circuits when the reset signal goes high. The following discussion applies to active low and active high reset signals.

Reset signals can be used in synchronous and/or asynchronous systems. In synchronous systems, reset signals take effect on a clock cycle subsequent to the reset signal. In asynchronous systems, reset signals take effect immediately, without regard to a clock cycle.

When a synchronous system is to be reset, the reset signal needs to go away at a good time relative to a local clock signal that drives the circuit. For example, a trailing or rising edge of an active low reset signal should not occur near a transition of the clock signal. Otherwise, the reset signal may not be adequately captured by the circuit. If the reset signal is not adequately captured by the circuit, a timing violation occurs that can cause instability within the circuit and/or cause a test of the system to fail. Thus, reset signals should be synchronized with the local clock so that the reset signal occurs sufficiently between rising edges of the local clock.

There are a number of situations where a reset signal may not be properly synchronized with a local clock signal. One situation is where a reset signal is generated in a first clock domain having a first frequency, but is used in a second clock domain having a second frequency. Another situation is where there is delay between a reset signal generator and a circuit that utilizes the reset signal. The delay can be the result of physical distance between the reset signal generator and the circuit that utilizes the reset signal. Alternatively, or additionally, the delay can be the result of circuit components coupled between the reset signal generator and the circuit that utilizes the reset signal Therefore, what is needed is a system and method to synchronize a reset signal with a local clock.

BRIEF SUMMARY OF THE INVENTION

The present invention is directed to methods and systems for synchronizing a reset signal with a local clock signal.

Embodiments of the present invention provide a system for synchronizing a reset signal to a local clock. The system includes a local clock terminal, a reset terminal, a synchronized reset output terminal, and synchronizing circuitry coupled between the clock terminal, the reset terminal, and the synchronized reset output terminal. The synchronizing circuitry synchronizes a received reset signal to the local clock signal and outputs a synchronized reset signal on the synchronized reset output terminal.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
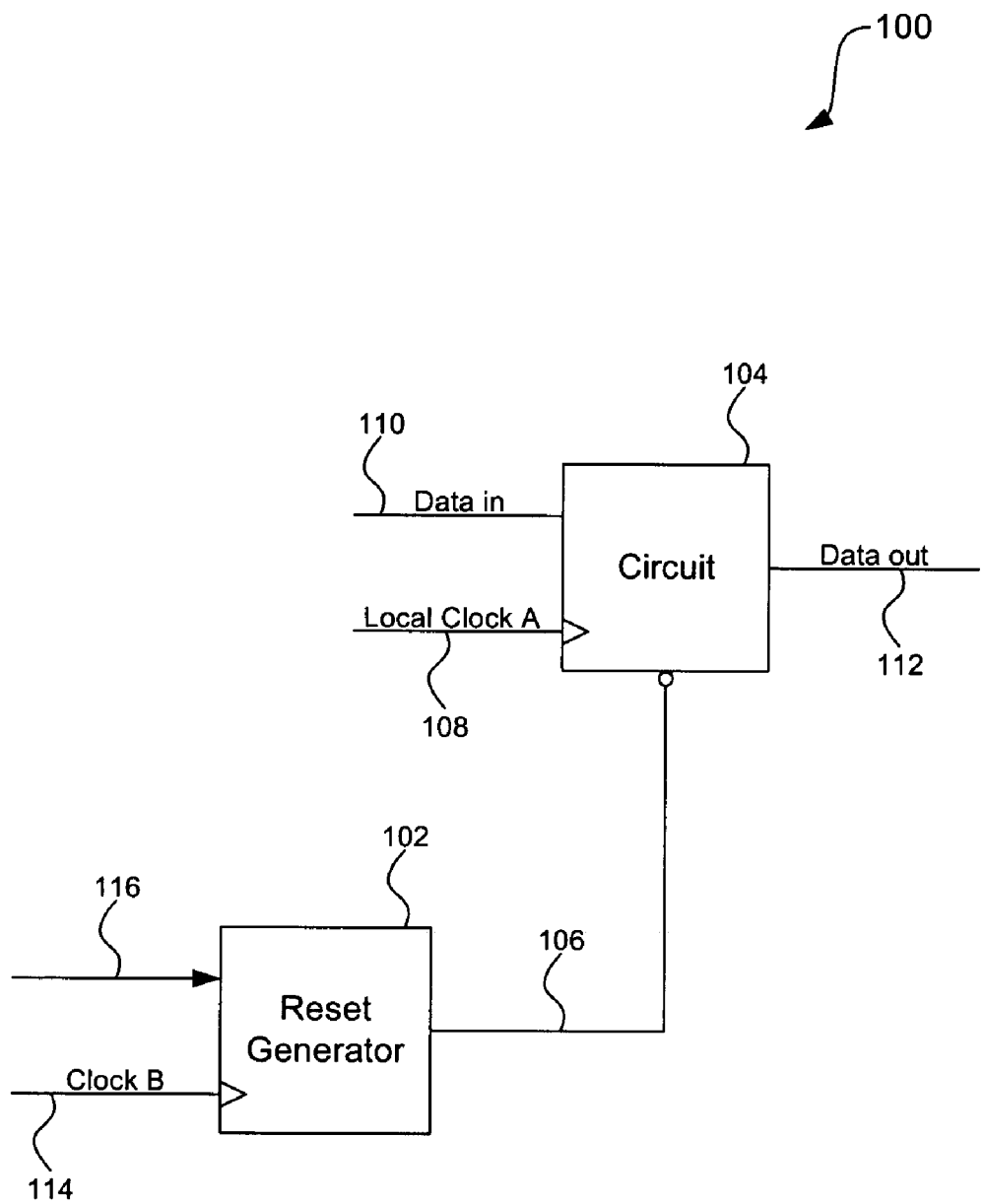
FIG. 1 is a block diagram of a portion of an integrated circuit chip including a reset generator.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system that synchronizes a reset signal before transmitting it to a circuit. In the circuit system, the reset signal can be used to reset one or more flip-flops, memory devices, and/or logic. Synchronization of the reset signal allows the reset signal to change at an appropriate time period in relation to a clock signal driving the circuit. This ensures the system will remain stable during reset, and no data will be lost as it is processed in the circuit. Other aspects of the present invention are that it can use a plurality of reset signals (e.g., software, hardware, and local software reset signals) to form an output reset signal and it can use a testing system to allow for testing of the clocking system.

System for Synchronization of a Reset Signal

FIG. 1 is a block diagram of a portion 100 of an integrated circuit chip including a reset generator 102 and circuit 104.

Circuit 104 can include flip-flops, logic, memory, and/or other circuitry. The reset generator 102 generates a reset signal 106 that resets circuit 104, or a portion thereof.

The circuit 104 receives input data 110 and generates output data 112. A local clock drives the circuit 104, illustrated here as clock A 108. Functions within the circuit 104 generally operate at the rate of clock A 108.

The reset generator 102 is driven by a clock B 114, which may or may not be the same as clock A 108. In various embodiments, reset generator 102 also receives other input signals 116 (e.g., reset sources and/or control signals).

When the reset signal 106 is coupled to one or more synchronous elements within the circuit 104, the reset signal 106 should be synchronized with clock A 108. There are several situations when the reset signal 106 may not be synchronized with clock A 108. For example, when clock B 114 is a different frequency that clock A 108, the reset signal 106 may not be synchronized with the clock A 108. Alternatively, or additionally, when there is delay between the reset generator 102 and the circuit 104, the reset signal 106 may not be synchronized with clock A 108. Alternatively, or additionally, when clock A 108 and clock B 112 are out of phase with each other (e.g., a same frequency, but edges do not line up), the reset signal 106 may not be synchronized with the clock A 108.

Accordingly, the present invention is directed to methods and systems for synchronizing the reset signal 106 with local clock A 108.

Figure 2:
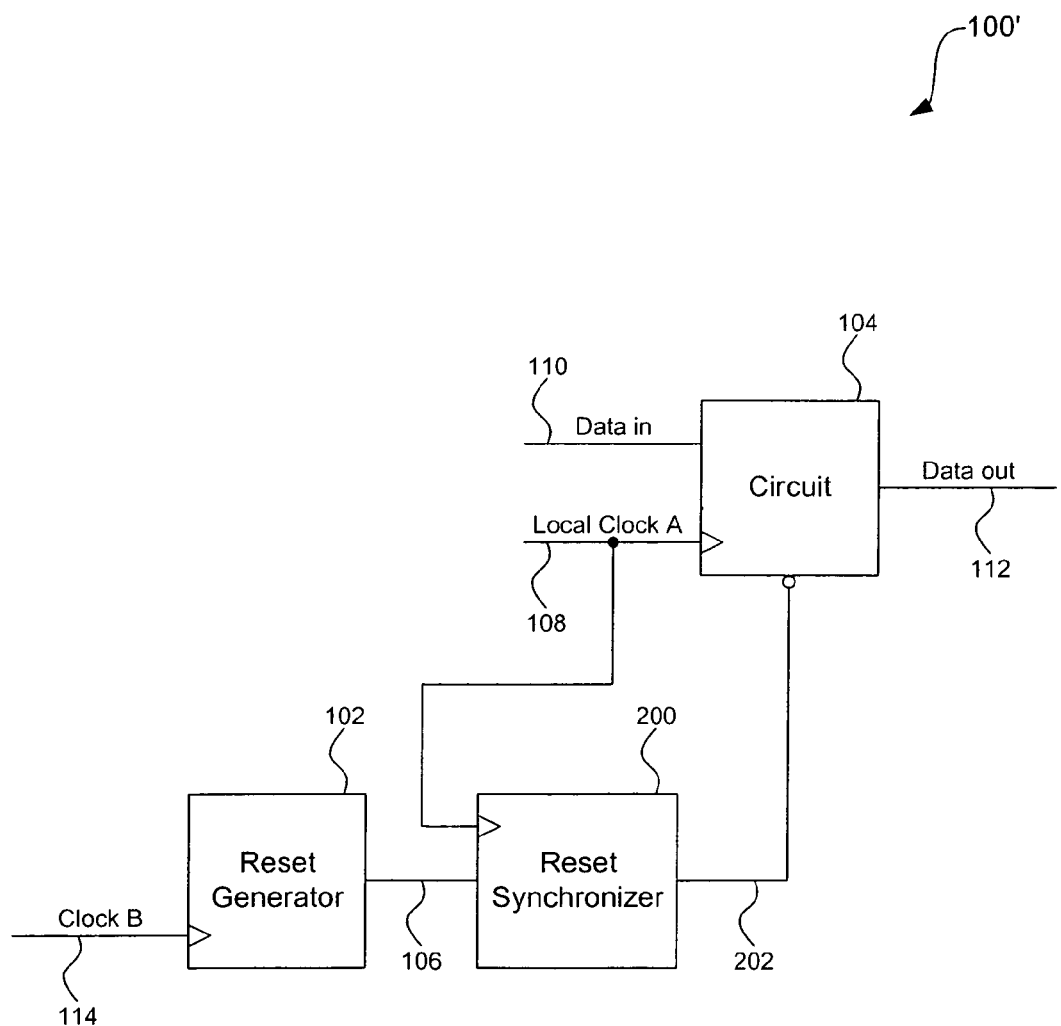
FIG. 2 is a block diagram of the portion in FIG. 1 including a reset synchronizer according to embodiments of the present invention.

FIG. 2 is a block diagram of the portion 100', including a reset synchronizer 200 that receives the reset signal 106 and the local clock A 108, and synchronizes the reset signal 106 with the local clock A 108, according to embodiments of the present invention. The reset synchronizer 200 outputs a synchronized reset signal 202 that is used to reset circuit 104 or portions thereof.

Figure 3:
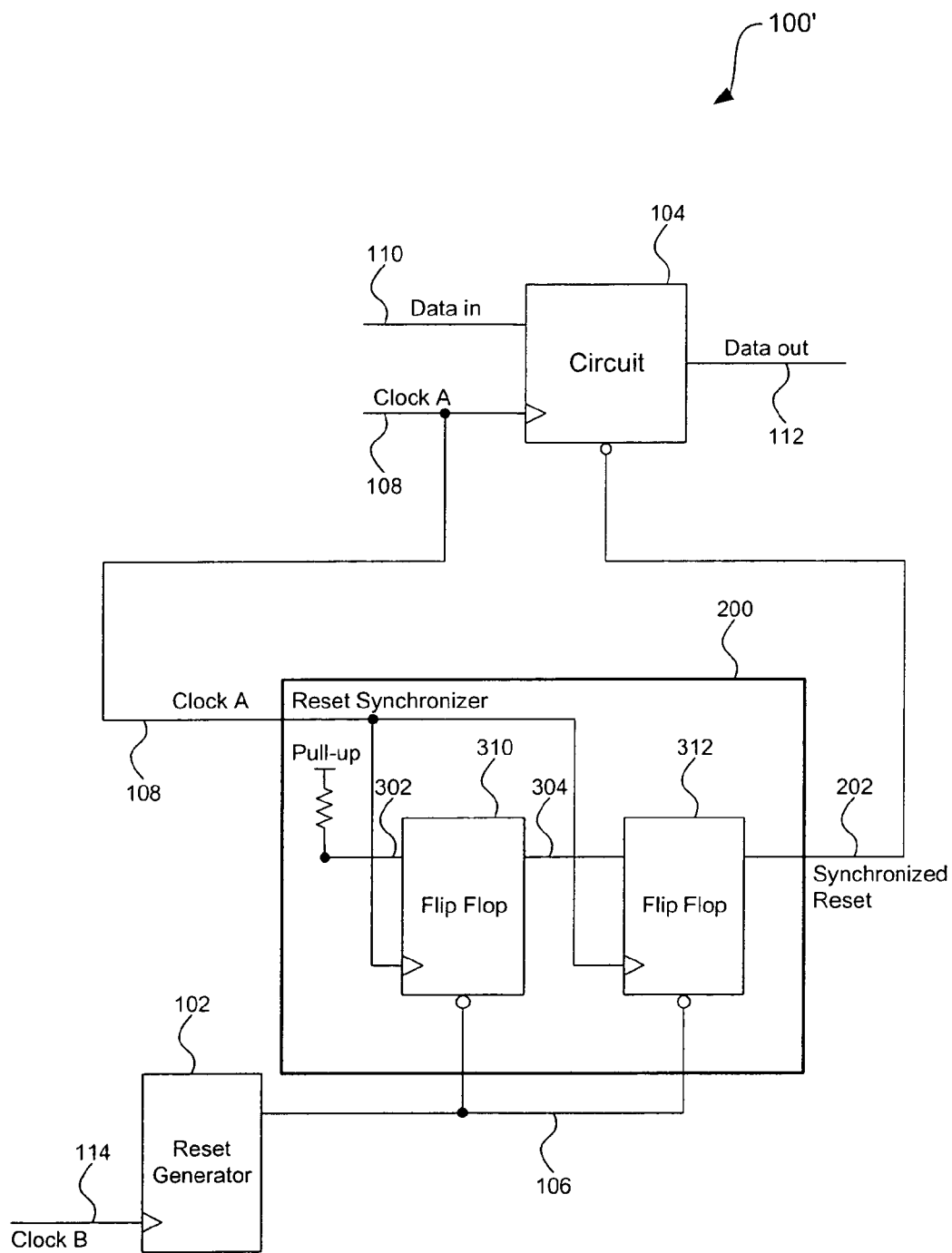
FIG. 3 is a block diagram of the reset synchronizer in FIG. 2 according to embodiments of the present invention.

FIG. 3 is a block diagram of the portion 100', where the reset synchronizer 200 includes first and second flip-flops 310 and 312. First and second flip-flops 310 and 312 are driven by the local clock A 108. For an active low reset system, an input 302 to the first flip-flop 310 is tied high. Alternatively, for an active high reset system, the input to the first flip-flop 310 is tied low (not shown).

In operation, when reset signal 106 goes low, the first and second flip-flops 310 and 312 are reset. More particularly, upon a trailing or rising edge (i.e., a going away portion) of the reset signal 106, the flip-flops 310 and 312 come out of reset. Upon the next rising edge of clock A 108, the first flip-flop 310 clocks the high signal on input 302 to output 304. Upon the next rising edge of clock A 108, the high signal on output 304 is clocked into second flip-flop 312 and output as synchronized reset signal 202.

When the reset signal 106 is not synchronous with clock A 108, a timing violation can occur in the first flip-flop 310. More particularly, when the trailing or rising edge of reset signal 106 occurs too close to a rising edge of clock A 108, the flip-flop 310 may not properly clock the high signal at input 302 to the output 304. When this occurs, output 304 will not immediately rise to the high value. By the end of the current clock cycle, however, the output 304 will settle to the proper high value—in time to be clocked into second flip-flop 312. The high value is then clocked through second flip-flop 312 at the rate of clock A 108. The output synchronized reset signal 202 is thus synchronous with clock A 108. The reset synchronizer 200 thus synchronizes reset signal 106 to the rate of clock A 108, regardless of why the reset signal 106 was not initially synchronous with clock A 108.

Thus, based on using reset synchronizer 200, the undesirable timing violation behavior can be confined to flip-flop 310 and output 304. Otherwise, in conventional systems, the undesirable behavior can occur throughout circuit 104.

Hardware Resets and Software Resets

The present invention can be implemented to synchronize hardware and/or software based reset signals.

Figure 4:
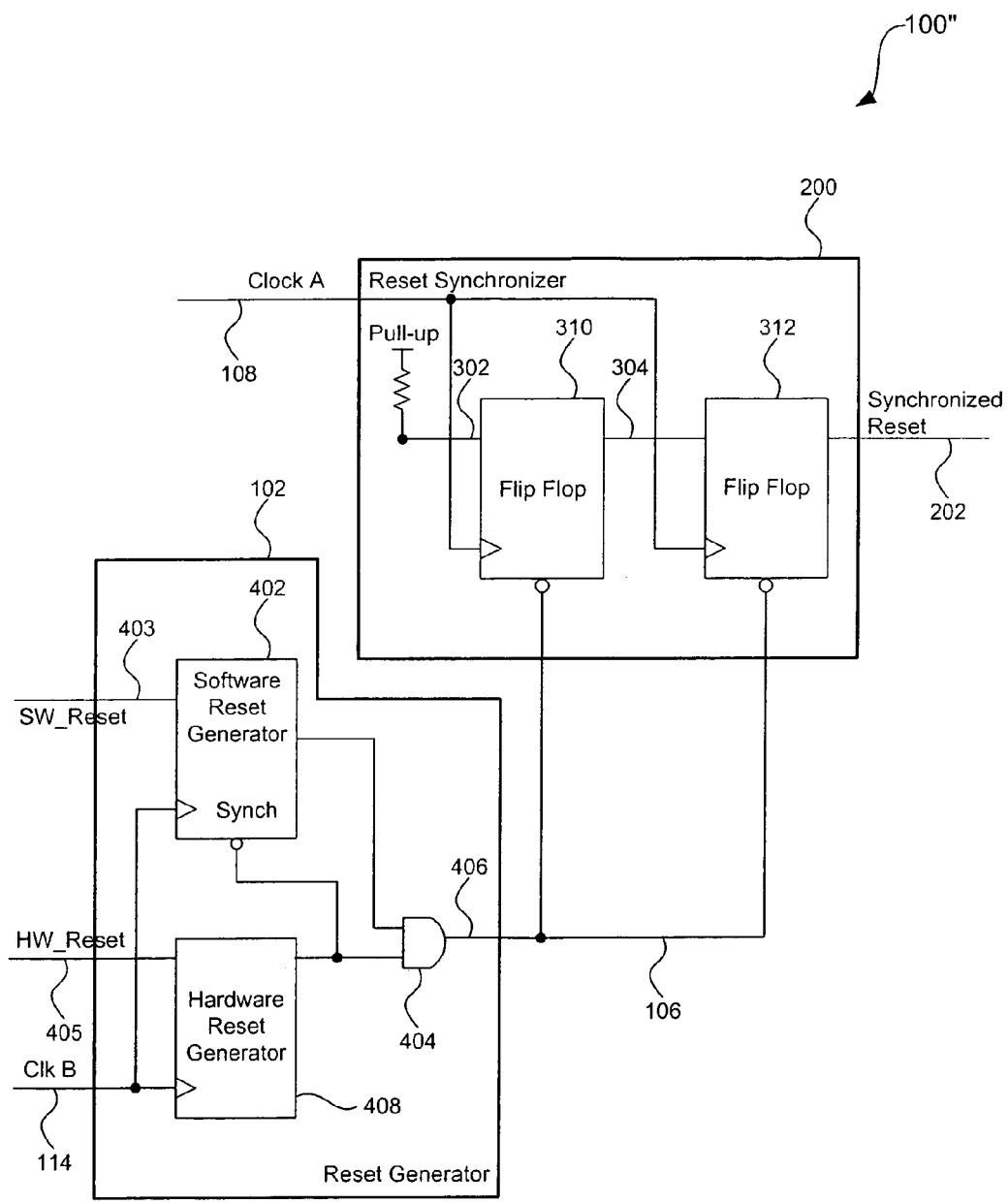
FIG. 4 is a block diagram of the portion in FIG. 1 including hardware and software based reset generators according to embodiments of the present invention.

FIG. 4 is a block diagram of the portion 100", where the reset generator 102 includes a software based reset generator 402 and a hardware based reset generator 408. In the example of FIG. 4, the software and hardware based reset generators 402 and 408 are driven by clock B 114. Alternatively, software based reset generator 402 and/or hardware based reset generator 408 can be driven by clock A 108.

The software based reset generator 402 receives SW_RESET signal 403. The hardware based reset generator 408 receives a HW_RESET signal 405. The SW_RESET signal 403 and HW_RESET signal 405 are received at AND gate 404, which generates reset output signal 406 as reset signal 106. The HW_RESET signal 405 can be generated manually when a button is pushed. The HW_RESET signal 405 is typically is used to reset an entire chip. The SW_Reset signal 403, on the other hand, is typically used to reset one or more functions within the chip.

In a still further embodiment, flip-flop 402 may have a synchronous reset terminal, which means operation of flip-flop 402 is synchronous with an input clock signal. In contrast, other flip-flops in system 100 can have asynchronous reset terminals. This means that the flip-flops can be reset at anytime regardless of the clock signal.

Testing Configuration

During a scan test, a string of data is sent through a chain of flip-flops with the circuit 104. An output of the last flip-flop in the chain is monitored for the string of data. If any flip-flops in the chain are reset during the scan test, the string of data can become corrupted. During scan test, therefore, flip-flops under test should generally not be reset.

Figure 5:
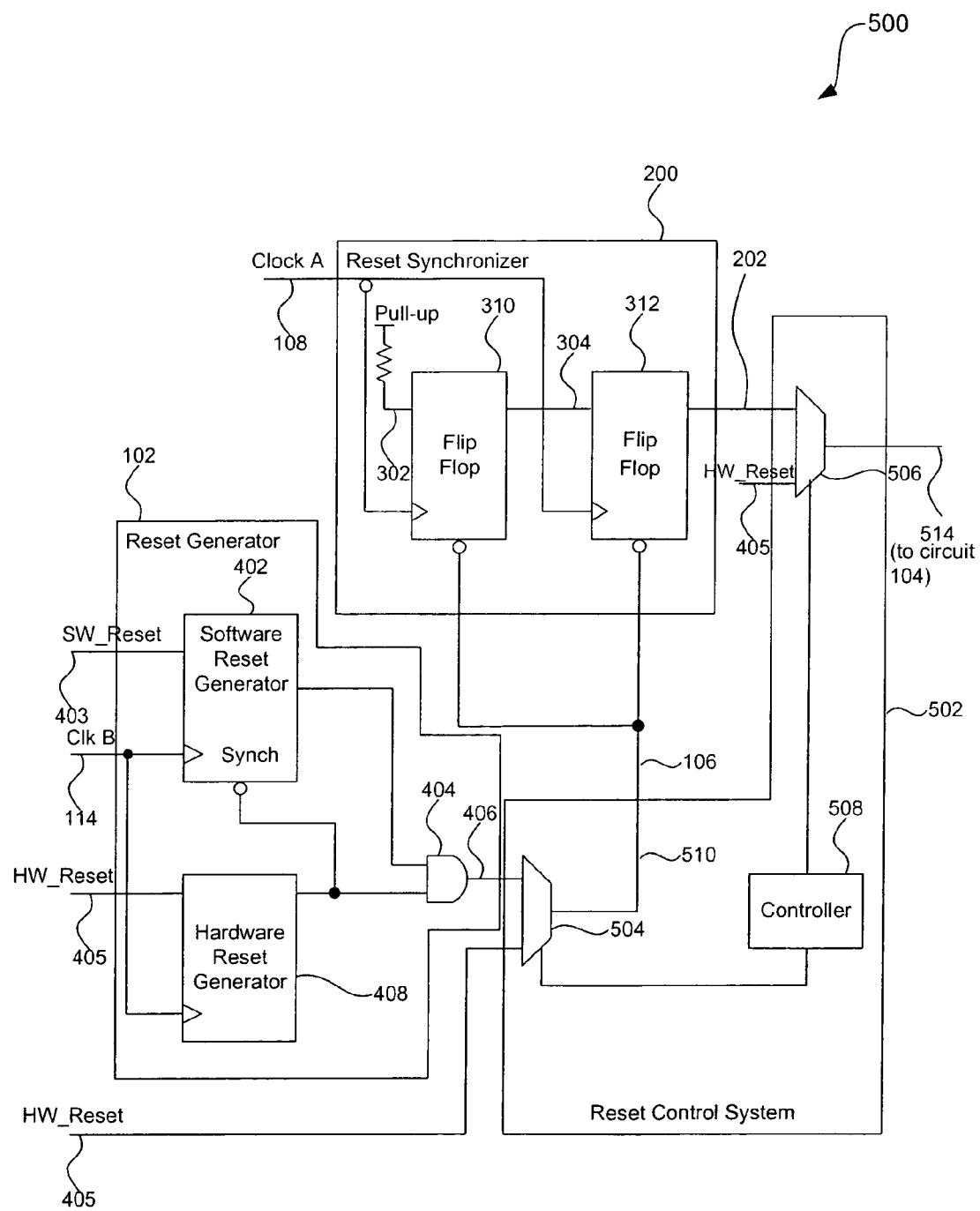
FIG. 5 is a block diagram of the portion in FIG. 1 including a reset control device according to embodiments of the present invention.

FIG. 5 is another block diagram of a portion 500, further including a reset control system 502 that prevents inadvertent resets during a scan test. In the example of FIG. 5, reset control system 502 includes first and second multiplexers 504 and 506 that are controlled by a controller 508.

First multiplexer 504 receives as inputs the HW_RESET signal 405 and signal 406 from AND gate 404. During normal operation, the controller 508 selectively controls the first multiplexer 504 to output the signal 406 to the reset synchronizer 200 as reset signal 106. During a scan test, the controller 508 selectively controls the first multiplexer 504 to output the HW_RESET signal 405 to the reset synchronizer 200 as reset signal 106. The scan test controls the HW_RESET signal 405 as needed during scan tests.

Second multiplexer 506 receives as inputs the HW_RESET signal 405 and the synchronized reset 202. During normal operation, the controller 508 selectively controls the second multiplexer 506 to output the synchronized reset 202 as an output signal 514. During a scan test, the controller 508 selectively controls the second multiplexer 506 to output the HW_RESET signal 405 as an output signal 514. Thus, controller 508 controls multiplexers 504 and 506 during scan test mode to output the HW_RESET signal 405. During scan test, the HW_RESET signal 405 is controlled by the scan test.

During test scan mode, seemingly random values are loaded serially (e.g., not through the normal path) into the various flip-flops (e.g., 402, 408, etc.). If the outputs of the various flip-flops 402 and 408 controlled the reset of flip-flops 310 and 312, then flip-flops 310 and 312 would be getting repeatedly reset as different values shift through flip-flops 402 and 408. Thus, if flip-flops 310 and 312 are held in reset, scan tests values cannot correctly shift through them, which is why scan chain data can get corrupted.

Local Software Resets

Figure 6:
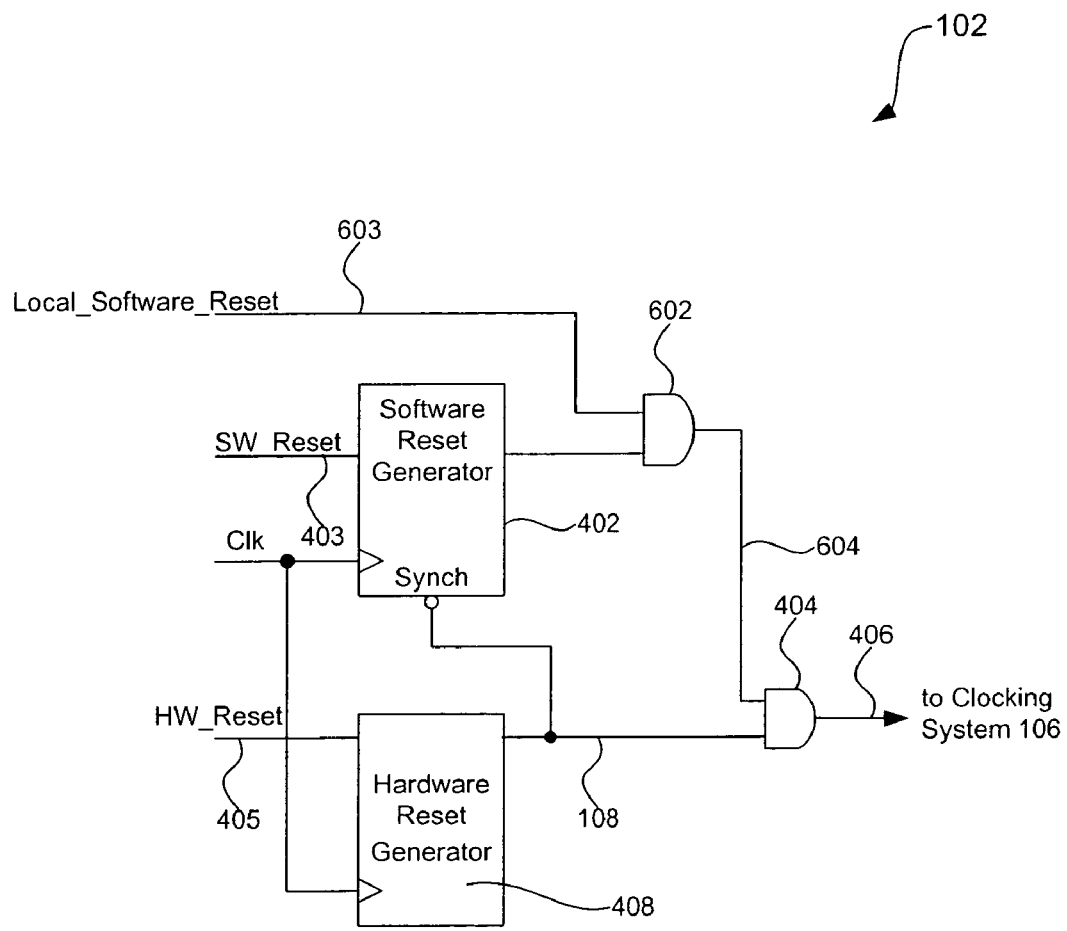
FIG. 6 is a block diagram of the portion in FIG. 1 including a local software reset device according to embodiments of the present invention.

FIG. 6 is a block diagram of the reset generator 102, further including an AND gate 602 that receives a LOCAL_SOFTWARE_RESET signal 603 and an output of software based reset generator 402, to output a signal 604 to AND gate 404. This allows more control over resetting of local functions within the chip.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for synchronizing a reset signal to a local clock, comprising:
    a local clock terminal;
    a reset terminal;
    a synchronized reset output terminal; and
    synchronizing circuitry coupled between the clock terminal, the reset terminal, and the synchronized reset output terminal, the synchronizing circuitry comprises,
    a first flip-flop including:
        a clock input coupled to the clock terminal,
        a reset input coupled to the reset terminal, and
        a data input coupled to a fixed bias of either pull up or pull down; and
    a second flip-flop including;
        a clock input coupled to the clock terminal,
        a reset input coupled to the reset terminal,
        a data input coupled to a data output of the first flip-flop, and
        a data output coupled to the synchronized reset output terminal;
    wherein the synchronizing circuitry synchronizes a received reset signal to the local clock and outputs a synchronized reset signal on the synchronized reset output terminal.

2. The system according to claim 1, further comprising a reset generator coupled to the reset terminal.

3. The system according to claim 2, wherein the reset generator is driven using a second clock.

4. The system according to claim 2, wherein the reset generator comprises:
    a hardware reset device outputting a hardware reset signal;
    a software reset device outputting a software reset signal; and
    a logic gate that receives the hardware and software reset signals and generates an output reset signal received at the reset terminal of the first and second flip-flops.

5. The system of claim 4, wherein the software reset device comprises a synchronous reset terminal that receives the hardware reset signal.

6. The system according to claim 2, wherein the reset generator comprises:
    a software reset device outputting a software reset signal;
    a local software reset device outputting a local software reset signal;
    a first logic gate receiving the software reset signal and the local software reset signal and generating a output software reset signal;
    a hardware reset device outputting a hardware reset signal; and
    a second logic gate that receives the hardware and output software reset signals and generates an output reset signal received at the reset terminal of the first and second flip-flops.

7. The system of claim 6, wherein the software reset device comprises a synchronous reset terminal that receives the hardware reset signal.

8. The system according to claim 2, further comprising test control circuitry coupled to the reset generator and the synchronizing circuitry, the test control circuitry comprising:
    a first multiplexer that receives a reset output signal from the reset generator at a first input and a hardware reset signal at a second input;
    a second multiplexer that receives the synchronized reset signal at a first input and the hardware reset signal at a second input; and
    a controller coupled to control terminals of the first and second multiplexers to selectively control the multiplexers.

9. The system of claim 8, wherein the first and second multiplexers output the hardware reset signal during a test mode.

10. The system of claim 9, wherein the test mode comprises a scan test mode.

* * * * *